(12) United States Patent
Glagow et al.

(10) Patent No.: US 6,233,872 B1
(45) Date of Patent: May 22, 2001

(54) SEALING SECTION FOR A POWER-OPERATED CLOSING DEVICE

(75) Inventors: Klaus Glagow, Wasserburg; Rashid Ahmad, Lindau; Bernd Westerhoff, Dietmannsried, all of (DE)

(73) Assignee: Metzeler Automotive Profiles GmbH, Lindau (DE)

( * ) Notice: Subject to any disclaimer, the term of this patent is extended or adjusted under 35 U.S.C. 154(b) by 0 days.

(21) Appl. No.: 09/423,709

(22) PCT Filed: Mar. 24, 1998

(86) PCT No.: PCT/EP98/01726

§ 371 Date: Feb. 28, 2000

§ 102(e) Date: Feb. 28, 2000

(87) PCT Pub. No.: WO98/52785

PCT Pub. Date: Nov. 26, 1998

(30) Foreign Application Priority Data

May 16, 1997 (DE) .............................................. 197 20 713

(51) Int. Cl.⁷ ..................................................... E05F 15/02
(52) U.S. Cl. .................................................................. 49/27
(58) Field of Search ..................................... 49/26, 27, 28; 200/61.43; 296/216.06, 216.09, 223

(56) References Cited

U.S. PATENT DOCUMENTS

| | | | | |
|---|---|---|---|---|
| 4,273,974 | * | 6/1981 | Miller | 49/27 X |
| 5,459,962 | * | 10/1995 | Bonne et al. | 49/28 |
| 5,834,719 | * | 11/1998 | Kaji et al. | 49/28 X |
| 6,125,591 | * | 10/2000 | Schmidhuber et al. | 49/26 X |

\* cited by examiner

*Primary Examiner*—Jerry Redman
(74) *Attorney, Agent, or Firm*—Stephen B. Salai, Esq.; Brian B. Shaw, Esq.; Harter, Secrest & Emery LLP

(57) ABSTRACT

Weatherseal includes two contact elements at a base portion or a domed profile portion that are coextruded electrically conductive profile portions separated by insulating profile portions, the contact elements being oriented in a longitudinal direction along the hollow profile and protruding into a hollow chamber. The contact elements have electrically conductive contact surface areas arranged at an inner side of the profile portion or at the base portion the contact surface area being coextruded electrically conductive profile portions. Contact of the contact elements and/or the contact surface areas together with the contact elements activates a switching action for controlling a drive assembly of a closing device.

8 Claims, 2 Drawing Sheets

SEALING SECTION FOR A POWER-OPERATED CLOSING DEVICE

This application claims priority under 35 USC 365(c) of prior application PCT/EP98/01726.

BACKGROUND OF THE INVENTION

Field of the Invention

The present invention relates to a weatherseal for sealing a powered closing device, more particularly for sealing automotive sunroofs, including an elastomeric hollow profile comprising a substantially planar base portion and a mounted domed profile portion circumscribing a hollow chamber.

One such weatherseal is known from DE 43 08 215 C1. This known weatherseal is conceived as a weatherstrip for a rigid lid in a vehicular roof. This weatherseal is configured with a hollow profile comprising a substantially planar base portion and a mounted domed profile portion circumscribing a hollow chamber. Weatherstrips of this kind find application more particularly in sunroofs and seal off the gap between sunroof and roof aperture. To define the weatherseal an appendage is provided in the base portion positively engaging a frame defined at the lid.

Where powered closing devices, more particularly electric automotive sunroofs, are concerned, there is a risk of bodily injury due to trapping on closure of such devices. Anti-trap guards are thus known to prevent such trapping injuries in the case of of powered closing device.

In DE 43 29 535 A1 an anti-trap guard for a powered closing device is described which consists of an extruded elastomeric hollow profile comprising spaced coextruded conductive portions in which metallic conductors are integrated to reduce the resistance. The conductive portions, serving as contact elements, are obtained by admixing conductive material to the elastomeric material. In this context it is known to apply the anti-trap guard as a separate part or integrally in material combination with the weatherseal. In a trapping situation the contact elements are brought together to thus activate a switching action in controlling the drive assembly of the closing device.

Described in EP 405 351 B1 is an anti-trap guard comprising a hollow profile with a hollow chamber. Provided in the hollow profile are coextruded conductive portions configured as strip-like protuberances jutting into the hollow chamber. In the base portion a companion contact surface area is provided which is likewise configured as a coextruded conductive portion. Such an anti-trap guard is designed for powered systems such as shutter gates and weldmesh shutters, aerial work access platforms and the like and is not intended as a weatherseal. In a trapping situation the contact elements configured as strip-like protuberances are brought into contact with the companion contact surface area in bridging the hollow chamber, activating a switching pulse for the drive assembly of the closing device.

The invention is based on the object of proposing a weatherseal of the aforementioned kind in which an anti-trap guard is integrated without detrimenting the sealing function.

SUMMARY OF THE INVENTION

To achieve this object it is proposed for a weatherseal of the aforementioned kind in accordance with the invention to provide at the base portion or at the domed profile portion two contact elements spaced away from each other configured as coextruded electrically conductive profile portions separated from each other by insulating profile portions, that the contact elements are oriented in the longitudinal direction of the hollow profile and protrude into the hollow chamber, that the contact elements are assigned an electrically conductive contact surface area arranged at the inner side of the profile portion or at the base portion, the contact surface area being configured as the coextruded electrically conductive profile portion and that the contact of the contact elements and/or of the contact surface area together with the contact elements activate a switching action for controlling the drive assembly of the closing device.

The weatherseal in accordance with the invention is characterized by it providing a sufficient flexure for the sealing function despite the integrated anti-trap guard so that the latter does not detriment the sealing function of the weatherseal. In a parallel trapping situation of the weatherseal in accordance with the invention the contact surface area is brought into contact with the contact elements protruding into the hollow chamber to thus activate the switching action. In a slanted trapping situation contacting is made either via the contact surface area or by bringing the two contact elements together, depending on the angle of attack. It is this contacting procedure differing as a function of the angle of attack that ensures a sufficient flexing to satisfy the sealing function. Furthermore, the weatherseal in accordance with the invention is characterized by it being simple to manufacture since it may be fabricated as a one-part coextrusion, this one-part structure also resulting in a long life since the contact elements are materially integrated.

In this arrangement the contact elements may be arranged either on the base surface area or at the inner side of the domed profile portion.

The weatherseal in accordance with the invention is conceived more particularly for sealing automotive sunroofs, although, of course, it may also find application as a weatherstrip for doors or trunk lids and the like.

Advantageous aspects of the invention read from the sub-claims.

To advantage the contact elements comprise an approximately L-shaped cross-sectional shape and are arranged mirror-inversely to each other.

To reduce the insulation resistance it is good practice to embed a full-length metallic conductor in the contact elements and/or the contact surface area.

To advantage, the metallic conductors are arranged in a plane located parallel to a fastening surface area of the base portion, so as to avoid material stress in a wrap-around configuration.

To advantage, the conducting profile portions are produced by admixing electrically conductive material to the elastomeric material, carbon black, graphite or powdered metal being applicable as the conductive material.

In another aspect it is proposed to provide the outer side of the mounted profile portion flaked.

In yet another aspect a fastener, to advantage a sticky tape, is provided at the outer side of the base portion.

The invention will now be detained by way of an advantageous example embodiment illustrated schematically in the drawing in which:

DESCRIPTION OF THE PREFERRED EMBODIMENT

Figure 1:
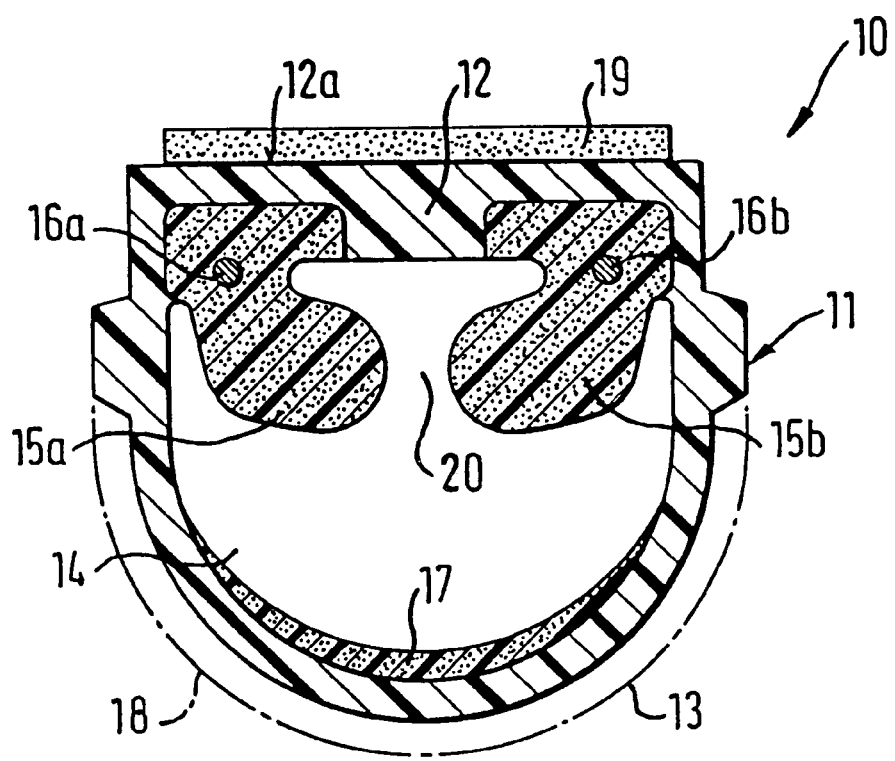
FIG. 1 is a cross-section through the weatherseal in accordance with the invention in no trapping situation.

Referring now to FIG. 1 there is illustrated the weatherseal 10 conceived as a weatherstrip for an automotive sunroof (not shown). The weatherseal 10 comprises a hollow profile 11 extruded in an elastomeric material, more particularly EPDM. The hollow profile 11 comprises a substantially planar base portion 12 provided on its outer side with a sticky tape 19 for securing it to a frame (not shown) of the sunroof. Adjoining the outer edges of the base portion 12 is a domed profile portion 13 which together with the base portion 12 defines a hollow chamber 14 of the hollow profile 11. The outer side of the domed profile portion 13 is provided flaked 18.

Provided at the base portion 12 are two contact elements 15a, 15b spaced away from each other by a gap 20, the contact elements being configured as coextruded conductive portions. In this arrangement the conductivity of the contact elements 15a, 15b is obtained by admixing conductive material, for example, carbon black, graphite or powdered metal to the elastomeric material. To reduce the insulation resistance metallic conductors 16a, 16b are incorporated in the contact elements 15a, 15b by coextrusion. The metallic conductors 16a, 16b are located in a plane oriented parallel to a fastening surface area 12a of the base portion 12, as a result of which material stresses are avoided especially in a wrap-around location of the weatherseal 10.

The contact elements 15a, 15b feature an approximately L-shaped cross-sectional shape, arranged spaced away from each other and mirror-inversely. The strip-like contact elements 15a, 15b extend in the longitudinal direction of the hollow profile 11.

Provided at the opposite inner side of the hollow chamber 14 is an electrically conductive con tact surface area 17 which is likewise configured as a coextruded conductive profile portion. Here too, the conductivity is obtained by admixing a conductive material to the elastomeric material.

The weatherseal 10 is produced as a one-part coextrusion to render fabrication particularly simple and to improve its useful life, since the contact elements are configured as an integral component of the hollow profile 11.

Figure 2:
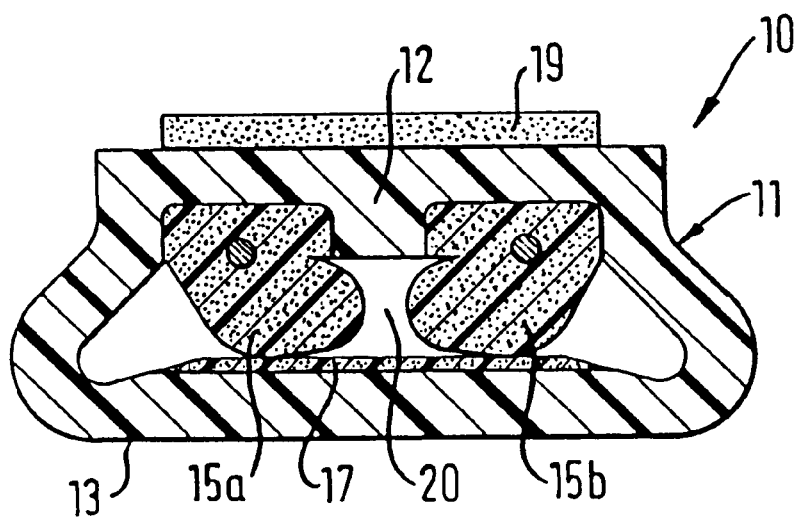
FIG. 2 is an illustration of the weatherseal as shown in FIG. 1, but in the parallel trapping situation.
Figure 4:
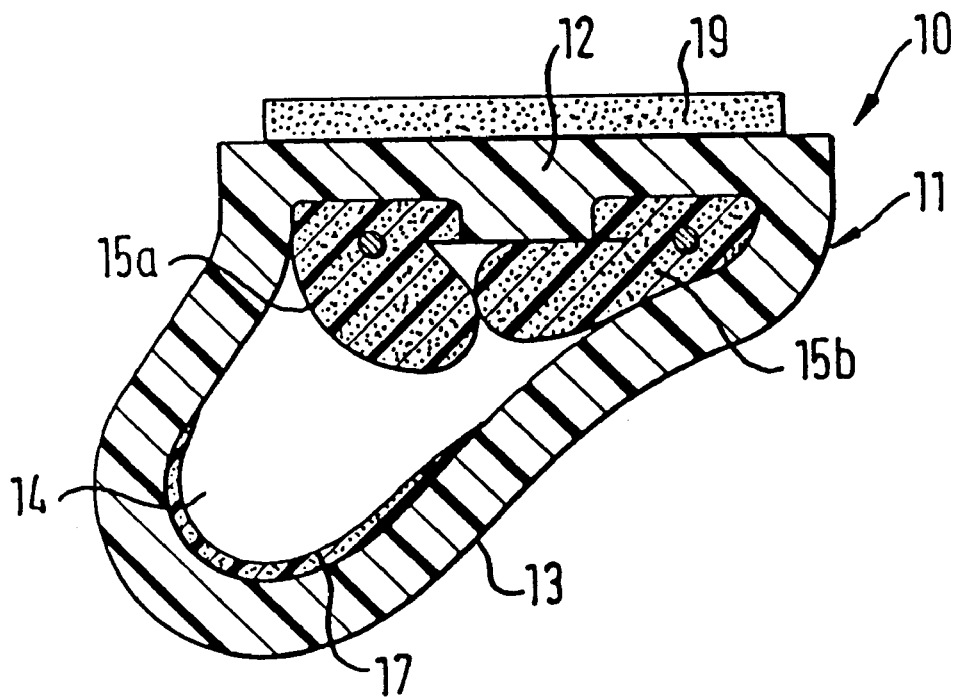
FIG. 4 is an illustration of the weatherseal as shown in FIG. 1, but in a 45° slanted trapping situation.

Referring now to FIGS. 2 and 4 illustrating various trapping situations the functioning of the weatherseal 10 will now be detailed.

Illustrated in FIG. 2 is the so-called parallel trapping situation in which loading occurs roughly parallel to the base portion 12. As evident from the trapping situation as shown in FIG. 2 the contact surface area 17 is brought into contact with the contact elements 16a, 16b by bridging the hollow chamber 14, thus resulting in the contact elements 16a, 16b being electrically connected to each other, producing a switching pulse to activate the drive assembly of the sunroof.

Figure 3:
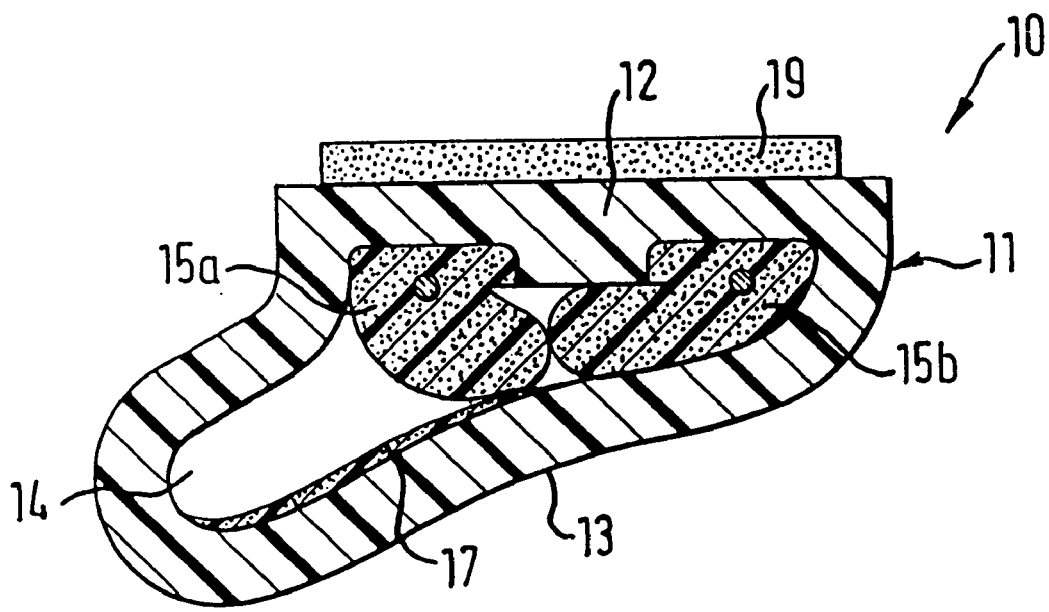
FIG. 3 is an illustration of the weatherseal as shown in FIG. 1, but in a 20° slanted trapping situation

Referring now to FIG. 3 there is illustrated the weatherseal 10 in the so-called slanted trapping situation in which loading occurs at a 20° angle of attack. As evident from this Figure the contact elements 16a, 16b are brought into contact with each other by the trapping situation to thus produce a switching pulse. At the same time the contact surface area 17 contacts the two contact elements 16a, 16b. The domed profile portion 13 is shifted sideways in the direction of loading.

Referring now to FIG. 4 there is illustrated a slanting trapping situation in which loading occurs at a 45° angle of attack. In this context the switching pulse is activated simply by contact made between the two contact elements 16a, 16b which are brought together by bridging the gap 20 existing between the contact elements.

Despite the integrated anti-trap guard the weatherseal 10 is able to fully satisfy the requirements as regards the sealing function and the flexure needed for this purpose. More particularly, an adequate flexure is available to satisfy the sealing function.

In addition to sunroofs the weatherseal in accordance with the invention may be put to use in weatherstripping doors and trunk lids.

What is claimed is:

1. A weatherseal, including an elastomeric hollow profile comprising a substantially planar base portion and a mounted domed profile portion circumscribing a hollow chamber, at said base portion or at said domed profile portion two contact elements being provided spaced away from each other configured as coextruded electrically conductive profile portions separated from each other by insulating profile portions, said hollow profile, said contact elements being assigned an electrically conductive contact surface area arranged at the inner side of said configured as said coextruded electrically conductive profile portion and the contact of one of said contact elements and said contact surface area together with said contact elements activating a switching action for controlling a drive assembly of a closing device, characterized in that said contact elements protrude into said hollow chamber, comprise an approximately L-shaped cross-sectional shape and are arranged mirror-inversely to each other.

2. The weatherseal as set forth in claim 1, characterized in that a full-length metallic conductor (16a, 16b) is embedded in said contact elements (15a, 15b) and/or said contact surface area (17).

3. The weatherseal as set forth in claim 1, characterized in that said metallic conductors (16a, 16b) are arranged in a plane located parallel to a fastening surface area (12a) of said base portion (12).

4. The weatherseal as set forth in claim 1, characterized in that said conducting profile portions (15a, 15b, 17) are produced by admixing electrically conductive material to said elastomeric material.

5. The weatherseal as set forth in claim 4, characterized in that carbon black, graphite or powdered metal is applied as said conductive material.

6. The weatherseal as set forth in claim 1, characterized in that the outer side of said domed profile portion is provided flaked (18).

7. The weatherseal as set forth in claim 1 characterized in that a fastener is provided at the outer of said base portion.

8. The weatherseal of claim 7 in which the fastener is sticky tape.

* * * * *

UNITED STATES PATENT AND TRADEMARK OFFICE
CERTIFICATE OF CORRECTION

PATENT NO.    : 6,233,872 B1
DATED         : May 22, 2001
INVENTOR(S)   : Klaus Glagow et al.

It is certified that error appears in the above-identified patent and that said Letters Patent is hereby corrected as shown below:

<u>Title page,</u>
Item [30], Foreign Application Priority Data
May 16, 1997 (DE) ................................. 197 20 713.8

Signed and Sealed this

Sixth Day of November, 2001

Attest:

*Nicholas P. Godici*

NICHOLAS P. GODICI
*Attesting Officer     Acting Director of the United States Patent and Trademark Office*